United States Patent [19]

Tomasina

[11] 4,097,972
[45] Jul. 4, 1978

[54] BAND CLAMP

[76] Inventor: Giuseppe Tomasina, Via Milano, 1, Ternate (Varese), Italy

[21] Appl. No.: 820,953

[22] Filed: Aug. 1, 1977

[30] Foreign Application Priority Data

Sep. 8, 1976 [IT] Italy .............................. 26993 A/76

[51] Int. Cl.² ........................................... F16L 33/10
[52] U.S. Cl. .................................................... 24/278
[58] Field of Search ................... 24/278; 16/DIG. 23; 138/99

[56] References Cited

U.S. PATENT DOCUMENTS

| 3,570,079 | 3/1971 | Turner | 24/278 |
| 3,601,867 | 8/1971 | Turner | 24/278 |

Primary Examiner—Bernard A. Gelak
Attorney, Agent, or Firm—William Anthony Drucker

[57] ABSTRACT

A band clamp including a band means wound in a ringwise fashion and showing a loop at the jointing point of the two free ends, a guide-plate provided with a notch or cutting in which the loop is caused to pass, a screw which may be screwed transversally to the end of the loop, and a U-shaped member, supporting a screw and disposed with the free ends checking with the guide-plate.

3 Claims, 3 Drawing Figures

BAND CLAMP

This invention relates to a band clamp, particularly adapted for the fastening of pipes to fittings, junctions and the like.

As well known for the fastening of hoses consisting of elastic material on fittings or rigid junctions there are used at present band clamps, in which a strip or band is wound about the pipe or hose to be fastened and circumferentially stretched by screwing of an endless screw or worm gear.

The said endless screw is tangentially disposed and engages with some notches, arranged on the band. Such clamps show, nevertheless, a complex structure with relatively high manufacturing costs, especially for the formation of such notches.

Furthermore, the band clamps referred to above are of not easy application, since there are encountered some difficulties to have the endless screw initially engage with the corresponding notches in the band.

The main object of this invention is to provide a band clamp of a rational and simple structure of low making cost and easy utilisation.

Such object is attained according to the present invention by a band clamp including: a band means wound in a ringwise fashion and showing a loop at the jointing point of the two free ends, a guide-plate provided with a notch or cutting in which the loop is caused to pass, a screw which may be screwed transversally to the end of the loop, and a U-shaped member, supporting a screw and disposed with the free ends checking with the guide-plate.

The screwing of the screw determines by traction the penetration of the loop into the U-shaped member so that the circumference of the band decreases and exerts a tightening action.

The band clamp according to this invention ensures to adjust at will the tightening of the band by screwing a simple screw acting as a tie-rod.

Furthermore, the locking action is exerted on the entire circumference of the pipe or hose to be tightened also thanks to the presence of the guide-plate.

In order to better illustrate the characteristic features and the advantages of the present invention, it will be described by making reference to the figures on the accompanying drawing, representing a preferred, but non-limiting emdobiment form given by way of example, in which.

Figure 1:
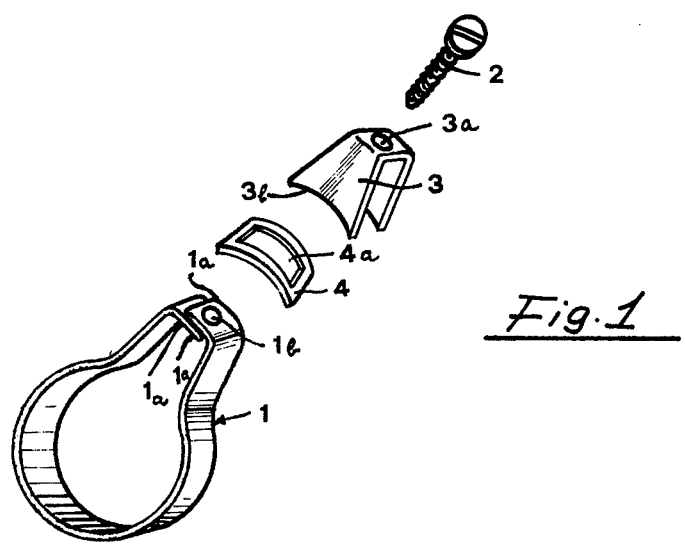
FIG. 1 shows a perspective schematic exploded view of the band clamp of this invention.
Figure 2:
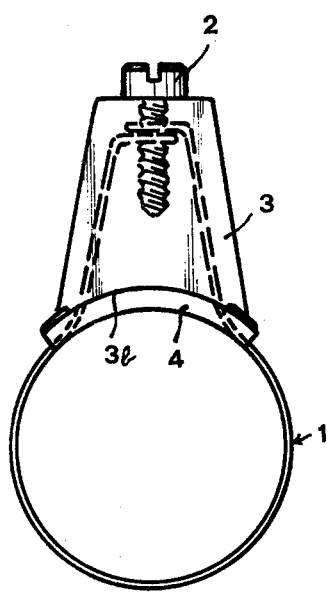
FIG. 2 represents a perspective front view of the band clamp given in FIG. 1.
Figure 3:
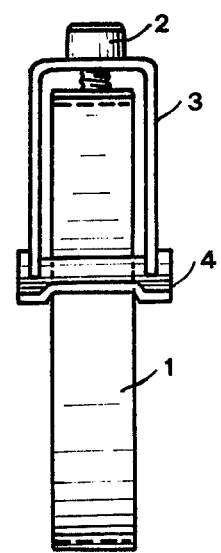
FIG. 3 represents a perspective side view of the band clamp given in the preceding figures.

Referring now particularly to the figures on the accompanying drawing, the band clamp of this invention includes a metal band 1, being wound in a ring-wise fashion so that both free ends 1a overlap each other. The said ends 1a build a loop and in the overlapped part there are provided the holes 1b, in which a self-tapping screw 2 engages. The screw 2 is supported by a bridge member 3, formed by a U-folded plate, provided in the horizontal part with a hole 3a through which the said screw 2 freely passes. The free ends 3b of the bridge member 3 are hollow and when the clamp is mounted, they adhere to an equally curved plate 4.

The plate 4 is provided with a central window opening 4a, through which the loop of the band 1 passes.

The plate 4, besides as a guide-plate for the loop of the band 1, acts a check means for the bridge member 3, into which the said loop fits.

Upon effected tightening, the plate 4 is aligned with the ring-like shaped band portion, thereby completing the circumference and adhering to the pipe or hose to be fastened. In practical use, the pipe to be fastened is wound with the band 1, so that the two holes 1b join each other, thereafter the plate 4 is fitted into the loop of the band 1 and thereupon there is disposed the bridge member 3 so that its hollow ends 3b rest on the plate 4.

The screw 2 is then inserted into the hole 3a and screwed into the hole 1b. By screwing in the screw 2 there is exerted a pressure on the loop of the band 11 by checking of the bridge 3 on the plate 4.

The screw 2 acts, therefore, as a tie-rod provoking the penetration of the loop into the bridge member 3 with a consequent decrease of the circumference and hence the tightening of the band 1 on the pipe to be fastened.

The tightening action takes place effectively on the entire circumference of the pipe or hose length by action also of the plate 4, which is pushed by reaction during the screwing of the screw 2 against the external surface of the pipe.

There is thus obtained a distribution of the tightening efforts on all the circumferential development of the locking zone and hence a better tightness relative to the clamps of well known types which show a corresponding section to the point whereat there is disposed the screw, not perfectly adhering to the pipe or hose to be locked. As may be seen from the foregoing description and accompanying figures, the band clamp of this invention shows a simple structure of easy and economical execution, whereas the locking action obtainable is most effective and well distributed throughout the surface of the pipe or hose to be locked.

This invention has been described and disclosed by way of a preferred, but non-limiting embodiment example, so that upon putting it into effect several changes and modifications may be introduced therein within the very spirit of this invention and without departing from its protection scope.

What I claim is:

1. A band clamp for the fastening of pipes or hoses consisting of elastic material on fittings or rigid junctions, including:
   (i) a metal band wound in a ring-wise fashion the free ends of which are provided with holes, being overlapped each other and so shaped as to build a loop;
   (ii) an arcuate guide-plate provided with a central window-opening into which there is inserted the loop;
   (iii) a U-shaped member having the free ends curved and resting upon the guide-plate, the said member being provided with a through-hole at the horizontal side, and
   (iiii) a screw passing through the U-shaped member and screwed to the holes of the loop-like shaped ends of the metal band.

2. A band clamp as defined in claim 1, wherein the screw is a self-tapping screw.

3. A band clamp as defined in claim 1, wherein the guide-plate completes the circumference of the ring-like shaped band and adheres to the pipe or hose to be fastened.

* * * * *